US011938676B2

(12) United States Patent
Hirooka et al.

(10) Patent No.: US 11,938,676 B2
(45) Date of Patent: Mar. 26, 2024

(54) MOLDING APPARATUS, MOLDING METHOD, AND METHOD FOR PRODUCING MOLDED ARTICLE

(71) Applicant: Mitsubishi Gas Chemical Company, Inc., Tokyo (JP)

(72) Inventors: Nobuki Hirooka, Yokohama (JP); Masao Yamawaki, Kure (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 51 days.

(21) Appl. No.: 17/269,636

(22) PCT Filed: Aug. 15, 2019

(86) PCT No.: PCT/JP2019/032005
§ 371 (c)(1),
(2) Date: Feb. 19, 2021

(87) PCT Pub. No.: WO2020/040025
PCT Pub. Date: Feb. 27, 2020

(65) Prior Publication Data
US 2021/0237352 A1 Aug. 5, 2021

(30) Foreign Application Priority Data
Aug. 21, 2018 (JP) .................. 2018-154946

(51) Int. Cl.
*B29C 67/00* (2017.01)
*B29C 64/118* (2017.01)
(Continued)

(52) U.S. Cl.
CPC .......... *B29C 64/209* (2017.08); *B29C 64/118* (2017.08); *B29C 64/35* (2017.08);
(Continued)

(58) Field of Classification Search
CPC ..... B29C 64/118; B29C 64/209; B29C 64/35; B33Y 30/00
See application file for complete search history.

(56) References Cited

U.S. PATENT DOCUMENTS

| | | | | |
|---|---|---|---|---|
| 5,340,433 A | * | 8/1994 | Crump | .................. B33Y 10/00 |
| | | | | 156/218 |
| 7,744,364 B2 | * | 6/2010 | Turley | .................. B29C 48/272 |
| | | | | 425/375 |

(Continued)

FOREIGN PATENT DOCUMENTS

| | | |
|---|---|---|
| CN | 106515006 A | 3/2017 |
| CN | 206124226 U | 4/2017 |

(Continued)

OTHER PUBLICATIONS

Dupont: Vespel, For high temperature bushing/washers in turbines, jet engines and aircraft applications, Retrieved online Oct. 6, 2022. Site: https://www.dupont.com/content/dam/dupont/amer/us/en/vespel/public/documents/en/Vespel_bushingswashers_aircraft_VPE_A40049_00_A0417.pdf (Year: 2022).*

(Continued)

*Primary Examiner* — Ryan M Ochylski
(74) *Attorney, Agent, or Firm* — Fitch, Even, Tabin and Flannery, LLP

(57) ABSTRACT

Provided is a molding technique with which a molding operation is performed smoothly, preventing the production of defective products. Also provided is a molding apparatus including a nozzle, a guide member guiding a molding material to the nozzle, and a heating device, the molding apparatus being further provided with a prevention structure configured to prevent the molding material from melting during transportation through the guide member.

9 Claims, 10 Drawing Sheets

(51) Int. Cl.
    *B29C 64/209*     (2017.01)
    *B29C 64/35*     (2017.01)
    *B29C 70/20*     (2006.01)
    *B33Y 10/00*     (2015.01)
    *B33Y 30/00*     (2015.01)
    *B33Y 40/00*     (2020.01)

(52) U.S. Cl.
    CPC ............... *B29C 70/20* (2013.01); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 9,738,030 B2 | 8/2017 | Lee et al. |
| 2009/0065965 A1 | 3/2009 | Bowen |
| 2014/0291886 A1* | 10/2014 | Mark .................... B29C 70/384 264/259 |
| 2015/0165666 A1 | 6/2015 | Butcher et al. |
| 2016/0009029 A1 | 1/2016 | Cohen et al. |
| 2017/0066187 A1 | 3/2017 | Mark et al. |
| 2017/0106606 A1 | 4/2017 | Toyozumi et al. |
| 2017/0209958 A1 | 7/2017 | Soshi |
| 2018/0154438 A1 | 6/2018 | Mark |
| 2018/0345577 A1 | 12/2018 | Takeyama et al. |
| 2020/0061906 A1 | 2/2020 | Nakai et al. |

FOREIGN PATENT DOCUMENTS

| | | |
|---|---|---|
| CN | 106915075 A | 7/2017 |
| CN | 206781007 U | 12/2017 |
| CN | 206870378 U | 1/2018 |
| JP | 2016-078205 A | 5/2016 |
| JP | 2016-107456 A | 6/2016 |
| JP | 2016-518267 A | 6/2016 |
| JP | 2016-172317 A | 9/2016 |
| JP | 2016-531020 A | 10/2016 |
| JP | 2017-128073 A | 7/2017 |
| JP | 2018-083872 A | 5/2018 |
| KR | 101843323 B1 | 3/2018 |
| TW | M501353 U | 5/2015 |
| WO | 2014/153535 A2 | 9/2014 |
| WO | 2015/009938 A1 | 1/2015 |
| WO | 2017/085961 A1 | 5/2017 |
| WO | 2017/212190 A1 | 12/2017 |

OTHER PUBLICATIONS

International Preliminary Report on Patentability and Written Opinion for PCT/JP2019/032005, dated Oct. 21, 2019, and English Translation submitted herewith (21 pages).

International Search Report for PCT/JP2019/032005, dated Oct. 21, 2019, and English Translation submitted herewith (5 pages).

Supplementary Partial European Search Report issued in corresponding European Application No. 19851804.5 dated Sep. 3, 2021 (21 pages).

Office Action issued in corresponding Chinese Application No. 201980054663.2 dated Mar. 2, 2022 (14 pages).

TIPO; Application No. 108129067; Office Action dated Oct. 11, 2022.

EPO; Application No. 19851804.5; Office Action dated Feb. 21, 2022, 5 pages.

\* cited by examiner

MOLDING APPARATUS, MOLDING METHOD, AND METHOD FOR PRODUCING MOLDED ARTICLE

CROSS-REFERENCE TO RELATED APPLICATIONS

This application is a U.S. national phase application filed under 35 U.S.C. § 371 of International Application Number PCT/JP2019/032005, filed Aug. 15, 2019, designating the United States, which claims priority from Japanese Application Number 2018-154946, filed Aug. 21, 2018.

FIELD OF THE INVENTION

The present invention relates to a molding technique.

BACKGROUND OF THE INVENTION

Composite materials are known as materials for resin molded articles. Examples include fiber-reinforced plastics (FRP): inorganic fiber-reinforced plastics (for example, carbon fiber-reinforced plastic (CFRP), glass fiber-reinforced plastic (GFRP), and other ceramic fiber-reinforced plastics), metal fiber-reinforced plastics, organic fiber-reinforced plastics (for example, aramid fiber-reinforced plastics, and natural fiber (for example, cellulose fiber) reinforced plastics), and resins containing conductive fibers (such as carbon fibers and metal fibers). The resin is, for example, a thermoplastic resin or a thermosetting resin.

Molding techniques such as extrusion molding and injection molding using various materials are also well known. In recent years, additive manufacturing technology (3D printer manufacturing technology) is also proposed. This technology is described as follows in the "2013 Patent Application Technical Trend Survey (Summary), 3D Printers". A 3D printer (additive manufacturing technology) refers to a process of creating an object from a numerical representation of a three-dimensional shape by attaching material. Often, this process is achieved by stacking a layer onto another layer. The representation of a 3D printer is used from a two-dimensional contrast output onto paper. In ASTM F2792-12a (Standard Terminology for Additive Manufacturing Technologies), the term additive manufacturing is used. For example, a 3D printer for CFRP has been proposed by MarkForged, Inc. As a fiber is added to materials, a previously known concept of free molding has been expanded to free fiber orientation.

Therefore, even in the aerospace and automotive industries, efforts are underway to develop CFRP products through additive manufacturing technology. The development of CFRP products through additive manufacturing is even being attempted in the mechanical component industry.

CITATION LIST

Patent Documents

Patent Document 1: JP 2016-78205 A
Patent Document 2: JP 2016-172317 A

DISCLOSURE OF THE INVENTION

A molding apparatus (3D printer) is illustrated in FIG. 9. FIG. 9 is a schematic view of a portion near a nozzle. In FIG. 9, reference numeral 100 denotes CFRP. This CFRP 100 is a wire material (a string-shaped or wire-shaped material). Reference numeral 101 denotes an extruder, 102 denotes a cutting device, 103 denotes a guide member (guide tube), 104 denotes an injection nozzle, and 105 denotes a heater. The injection nozzle 104 is made of metal. The metal injection nozzle 104 has a nozzle port 104A. The heater 105 is built into the metal injection nozzle 104. The heater 105 may also be a type of heater that is not built-in. The heat from the heater 105 is efficiently transmitted through the metal injection nozzle 104. As a result, the resin in the CFRP 100 at the nozzle port 104A position melts (fuses). The melted CFRP 100 is then supplied to a stage 106 and adhered thereto. In this way, wiring made of CFRP is formed.

However, it has been found that the device described above has the following problem. That is, the operation of supplying (traveling (pulling: feeding)) the wire material 100 is not smooth.

The present inventors investigated the cause of this problem. As a result, the inventors found that the resin of the wire material 100 melts or fluidizes in the guide member 103, and is adhered and deposited onto an inner wall surface of a hole of the guide member 103.

Therefore, the problem to be solved by the present invention is to provide a molding technique with which a molding operation can be performed smoothly and defective products are not easily generated.

The present invention was achieved based on the above findings.

The present invention proposes:

a molding apparatus including a nozzle, a guide member guiding a molding material to the nozzle, and a heating device, wherein a prevention structure is so provided as to prevent melting of the molding material during transportation of the molding material through the guide member.

The present invention also proposes the aforementioned molding apparatus, wherein the prevention structure is preferably a temperature increase prevention structure, which prevents heat from the heating device from transferring to the guide member.

The present invention also proposes the aforementioned molding apparatus, wherein the temperature increase prevention structure preferably includes a cooling structure that prevents the molding material from melting during transportation of the molding material through the guide member.

The present invention proposes the aforementioned molding apparatus, wherein the cooling structure includes a guide member having a thermal conductivity of not less than 10 W/m·k.

The present invention proposes the aforementioned molding apparatus, wherein the guide member includes a cooling structure that contains a cooling fin or a cooling water supply structure.

The present invention also proposes the aforementioned molding apparatus, wherein the temperature increase prevention structure preferably includes a heat insulation structure that prevents the molding material from melting during transportation of the molding material through the guide member.

The present invention proposes the aforementioned molding apparatus, wherein the heat insulation structure is preferably a heat insulation member provided between the heating device and the guide member.

The present invention proposes the aforementioned molding apparatus, wherein the heat insulation member is, for example, one or more selected from the group consisting of a gas, a liquid, and a solid.

The present invention proposes the aforementioned molding apparatus, wherein the gas is, for example, one or more selected from among the group consisting of air, nitrogen, and carbon dioxide.

The present invention proposes the aforementioned molding apparatus, wherein the liquid is, for example, water or an aqueous solution.

The present invention proposes the aforementioned molding apparatus, wherein the solid is, for example, a non-metallic material.

The present invention proposes the aforementioned molding apparatus, wherein the heat insulation structure is preferably a gap provided between the heating device and the guide member.

The present invention proposes the aforementioned molding apparatus, wherein the gap is preferably from 3 to 500% of a maximum inner diameter dimension of a nozzle port.

The present invention proposes the aforementioned molding apparatus, wherein the prevention structure is preferably a cooling structure.

The present invention proposes the aforementioned molding apparatus, wherein the cooling structure is preferably a blowing structure.

The present invention proposes the aforementioned molding apparatus, wherein the cooling structure is preferably a cooling water supply structure.

The present invention proposes the aforementioned molding apparatus, wherein the prevention structure is preferably a heat dissipation structure.

The present invention proposes the aforementioned molding apparatus, wherein the molding material is a fiber-containing resin, and preferably a commingled yarn.

The present invention proposes the aforementioned molding apparatus, wherein the molding material is a conductive fiber-containing resin.

The present invention proposes the aforementioned molding apparatus, which preferably includes a cleaning structure for cleaning a nozzle port of the nozzle.

The present invention proposes a molding apparatus including: a nozzle; a guide member guiding a molding material to the nozzle; and a heating device heating the nozzle; the molding material being a fiber-containing resin, the nozzle including a nozzle port and a hole that is communicated with the nozzle port, an inner diameter of the hole of the nozzle being more than an outer diameter of the guide member, a tip end side of the guide member being disposed toward the nozzle port, and a gap being provided between the guide member and the nozzle, wherein during transportation of the molding material through the guide member, the molding material is prevented from melting even when the nozzle is heated by the heating device.

The present invention proposes a molding apparatus including: a nozzle; a guide member guiding a molding material to the nozzle; and a heating device heating the nozzle; the molding material being a fiber-containing resin, the nozzle including a nozzle port and a hole that is communicated with the nozzle port, an inner diameter of the hole of the nozzle being more than an outer diameter of the guide member, a tip end side of the guide member being disposed inside the hole of the nozzle, and a gap being provided between the guide member and the nozzle, wherein during transportation of the molding material through the guide member, the molding material is prevented from melting even when the nozzle is heated by the heating device.

The present invention proposes a molding apparatus including: a nozzle; a guide member guiding a molding material to the nozzle; and a heating device heating the nozzle; the molding material being a fiber-containing resin, the nozzle including a nozzle port and a hole that is communicated with the nozzle port, the guide member being a tubular member, an inner diameter of the hole of the nozzle being more than an outer diameter of the tubular member, a tip end side of the tubular member being disposed toward the nozzle port, and a gap being provided between the tubular member and the nozzle, wherein during transportation of the molding material through a hole of the tubular member, the molding material is prevented from melting even when the nozzle is heated by the heating device.

The present invention proposes a molding apparatus including: a nozzle; a guide member guiding a molding material to the nozzle; and a heating device heating the nozzle; the molding material being a fiber-containing resin, the nozzle including a nozzle port and a hole that is communicated with the nozzle port, the guide member being a tubular member; a tip end side of the tubular member being disposed inside the hole toward the nozzle port, wherein during transportation of the molding material through an inside of a hole of the tubular member, a prevention structure is configured to prevent the molding material from melting.

The present invention proposes:

a molding method by a molding apparatus including a nozzle, a guide member guiding a molding material to the nozzle, and a heating device, the molding method including:

implementing control such that during transportation of the molding material through the nozzle, the molding material is melted by heat from the heating device, and during transportation of the molding material through the guide member, the molding material is not melted by heat from the heating device.

The present invention proposes:

a molding method by the aforementioned molding apparatus, the molding method including:

implementing control such that during transportation of the molding material through the nozzle, the molding material is melted by heat from the heating device, and during transportation of the molding material through the guide member, the molding material is not melted by heat from the heating device.

The present invention proposes:

a method for producing a molded article by a molding apparatus including a nozzle, a guide member guiding a molding material to the nozzle, and a heating device, the production method including:

implementing control such that during transportation of the molding material through the nozzle, the molding material is melted by heat from the heating device, and during transportation of the molding material through the guide member, the molding material is not melted by heat from the heating device.

The present invention proposes:

a method for producing a molded article by the aforementioned molding apparatus, the production method including:

implementing control such that during transportation of the molding material through the nozzle, the molding material is melted by heat from the heating device, and during transportation of the molding material through the guide member, the molding material is not melted by heat from the heating device.

The molded article is preferably wiring.

According to the present invention, a molding operation is performed smoothly, preventing the production of defective products.

For example, when wiring is formed using a wire material made of a resin containing a conductive material, deviation in the dimensions of the wiring is minimal. Therefore, there is less variation in electrical resistance between different locations, and high quality wiring is formed.

The present invention can be easily implemented.

DESCRIPTION OF EMBODIMENTS

Figure 1:
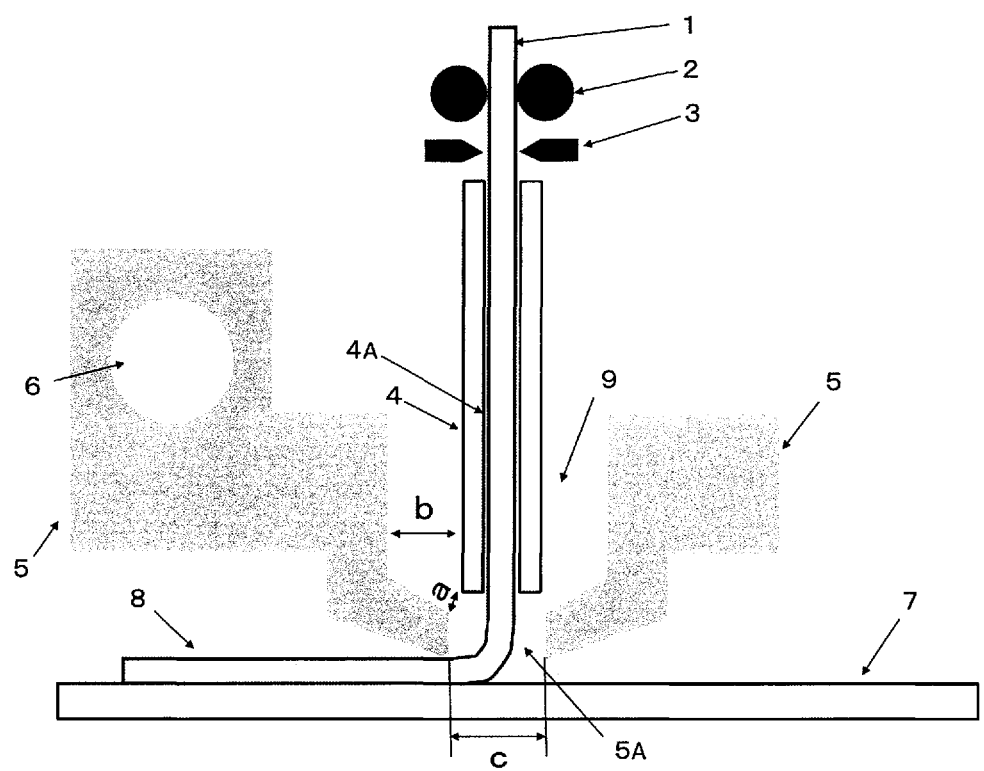
FIG. 1 is a schematic view in a vicinity of a nozzle of a molding apparatus of a first embodiment of the present invention.

Embodiments of the present invention are described.

A first aspect of the present invention is a molding apparatus. The molding apparatus includes a nozzle. This nozzle is, for example, made of metal. The nozzle may be non-metallic. The molding apparatus includes a guide member. A part (for example, a tip side) of the guide member is disposed inside the nozzle. For example, a tip end side of the guide member is disposed toward a nozzle port of the nozzle. A molding material is guided to the nozzle by the guide member. The molding material exiting the nozzle port of the nozzle is supplied to a target object (target). The molding material is linear (a line). "Linear" means a shape having a length. "Linear" further means not granular. The molding material is, for example, a conductive resin. The molding material may also be a non-conductive resin. The use of a conductive or non-conductive resin is decided based on the object to be molded. When forming wiring, the molding material is typically conductive. If not forming wiring, the molding material may be non-conductive. Of course, the molding material may also be conductive in such a case. The molding apparatus includes a heating device (heating means). The heating device and the nozzle may be provided as an integral part. For example, the nozzle may be a type of nozzle having a built-in heating device (heater). If the nozzle is made of metal, when the heater is built into the nozzle, heat from the heater is efficiently transmitted to the nozzle port of the nozzle.

When the molding material includes a thermoplastic resin, the molding material exiting the nozzle port is heated and melted as a result. When the molten molding material comes into contact with the target object (base: target), the molding material is cooled and affixed to the target object. The thermoplastic resin may also be heated and melted, and discharged from the nozzle port. In this case, the molding material exiting the nozzle port may be cooled in air before contacting the target object.

The molding apparatus includes a prevention structure that prevents the molding material from melting. The prevention structure prevents the molding material from melting during transportation of the molding material through the guide member. That is, when the molding material being transported through the guide member melts, the molding material may be welded onto an inner wall surface of the guide member. As a result, the molding material does not travel smoothly. At a location where welding of the molding material occurs, the inner diameter of the hole of the guide member is reduced. As a result, the amount of molding material that is supplied is also reduced. In a case of molding wiring, the width (thickness) of the wiring is reduced, and the electrical resistance increases.

In a case where the molding material contains a thermosetting resin, when the fluidity of the thermosetting resin is increased by heating, the molding material may adhere to the wall surface without the guide member and cure in place. As a result, the molding material does not smoothly travel. At the location where the molding material adheres, the inner diameter of the hole in the guide member is reduced. As a result, the amount of molding material that is supplied is also reduced. In a case of molding wiring, the width (thickness) of the wiring is reduced, and the electrical resistance increases.

The prevention structure is, for example, a temperature increase prevention structure. Through the temperature increase prevention structure, heat from the heating device is not easily transmitted to the guide member.

The prevention structure (the temperature increase prevention structure) is a cooling structure for the guide member that prevents the molding material from melting during transportation through the guide member. For example, the cooling structure is a molding apparatus including a guide member having a thermal conductivity of not less than 10 W/m·k. For example, the guide member is a cooling structure provided with a blowing structure or a cooling water supply structure. By providing a guide member having a thermal conductivity of not less than 10 W/m·k (preferably, a thermal conductivity from 10 to 300 W/m·k), and equipping the guide member with a blowing structure or a cooling water supply structure, the effect of preventing an increase in temperature of the guide member can be increased. A guide member having a high degree of thermal conductivity can be selected as the guide member. Examples of the material thereof include plastics and metals. Preferable examples of plastics having high thermal conductivity include plastics filled with a filler having high thermal conductivity. Examples of such fillers include carbon black, carbon fibers, carbon nanofibers, carbon tubes, carbon nanotubes, carbon nanohorns, fullerenes, metal fibers, metal powders, and metal flakes.

Figure 7:
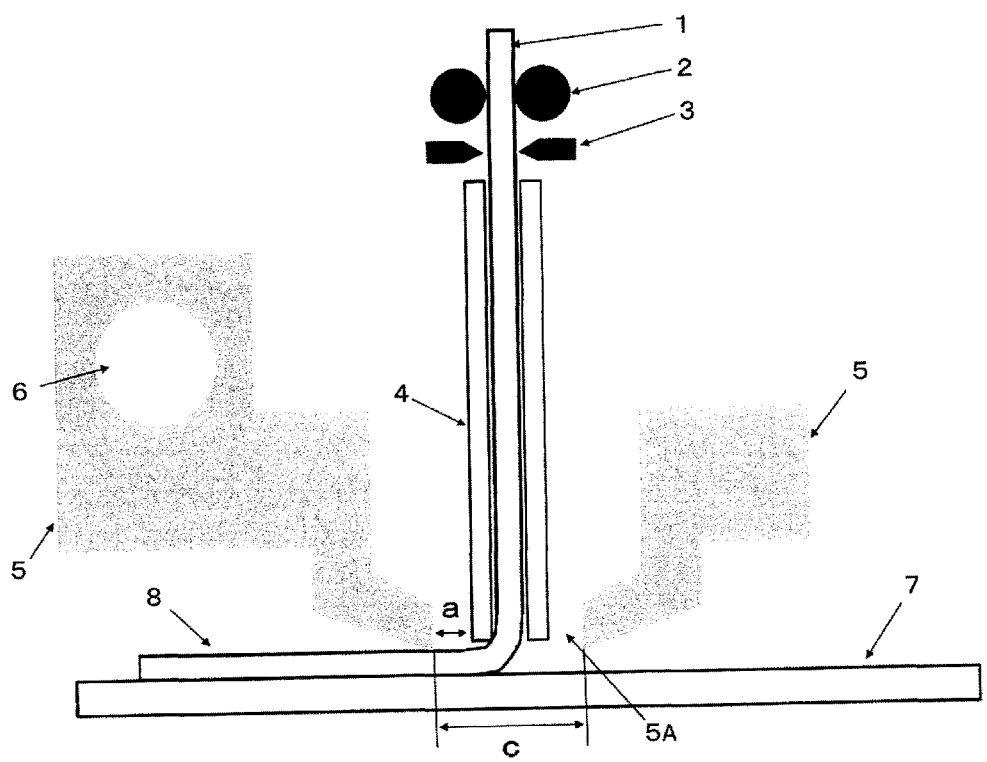
FIG. 7 is a schematic view in the vicinity of a nozzle of a molding apparatus of a seventh embodiment of the present invention.

The prevention structure (the temperature increase prevention structure) is, for example, a heat insulation structure. For example, the heat insulation structure may be a heat insulation member provided between the heating device and the guide member. The heat insulation member is one or more types selected from the group consisting of gases, liquids, and solids, and a gas is preferable. Any type of gas may be used. That is, the thermal conductivity of a gas is significantly lower than that of a metal. Examples of the gas include air, nitrogen, and carbon dioxide. From a cost perspective, air may be selected. When a gas is present between the heating device and the guide member, heat from the heating device is not easily transmitted to the guide member. Accordingly, the guide member does not reach a high temperature (a temperature at which the molding material being transported through the guide member melts). Any type of liquid may be used. The thermal conductivity of a liquid is significantly lower than the thermal conductivity of a metal. For example, water or an aqueous solution may be selected from the perspectives of handling and cost. The solid is a non-metallic material. Metals having low thermal conductivity do exist. For example, the thermal conductivities of nickel silver, Manganin, and Wood's alloys are smaller than those of Ag and Cu. However, such metals are special metals and are less likely to be adopted from a cost perspective. Non-metallic materials are generally less thermally conductive than metal materials. Examples of non-metallic materials having a small thermal conductivity include metal oxides (for example, including, but not limited to, $FeO$, $Fe_2O_3$, and $MgO$). Other examples include asbestos, paraffins, mica, asphalt, cement, concrete, brick, clay, glass, cork, rubber, felt, silk, flannel, wood, and plastics (also including foamed plastics). In the present invention, glass wool is given as a preferable example. Cement, clay, and the like are relatively lightweight and heat resistant, and thus are also preferable. That is, even if the liquid or solid is present between the heating device and the guide member, heat from the heating device is not easily transmitted to the guide member. For example, if the solid or liquid is present in a portion of the metal nozzle (desired location: location positioned between the guide member and the heating device (heater)), heat from the heating device is not easily transmitted to the guide member. However, from the perspectives of implementation ease and cost, providing a gap between the heating device and the guide member is most preferable. Air is typically present in this gap. Due to the presence of this gap (air), heat from the heating device is not easily transmitted to the guide member. The gap is preferably not less than 3% of the maximum inner diameter dimension of the nozzle port. By configuring the gap to be 3% or more, a configuration can be achieved in which heat is less likely to be transmitted by the guide member. Therefore, the gap is more preferably 15% or more. The gap is even more preferably 30% or more. By reducing the gap, it is possible to reduce the size of the device. Therefore, the gap is preferably not more than 500%. The gap is more preferably not more than 200%. The gap is even more preferably not more than 100%. The value (dimension) of the gap refers to the shortest distance. This shortest distance a is illustrated in FIGS. 1 and 7.

A cooling structure is conceivable as the prevention structure. An example is a blowing structure. Wind from the blowing structure is blown onto the guide member. As a result, the temperature of the guide member does not increase. The temperature of the guide member is maintained, for example, at around room temperature (for example, 50° C. or less, and preferably from 15 to 40° C.). In a case where the blowing structure is provided, the gap will be present. In this case, the gap may be smaller than the aforementioned dimension. A cooling water supply structure may be used instead of the blowing structure. For example, a pipe may be arranged around the guide member, and water may be fed into the pipe. Even in this case, the temperature of the guide member does not increase. That is, melting of the molding material during transportation through the guide member is prevented.

A heat dissipation structure was considered as the prevention structure. When the guide member is provided with a heat sink, the temperature of the guide member immediately decreases even when the guide member is temporarily heated. As a result, the molding material being transported through the guide member does not melt.

The molding apparatus preferably includes a cleaning structure for cleaning the nozzle port of the nozzle.

The molding material is a resin. The resin may be any resin. A thermosetting resin may be used. A thermoplastic resin may be used. Either one may be used alone, or these resins may be used in combination. The resin may be one type or two or more types. In the present invention, a thermoplastic resin is preferable. The molding material is linear. Linear may be a fibrous form (yarn or filaments). In the case of a fibrous form, an example is a so-called commingled yarn (see, for example, WO 2016/167136 A1). In the case of a commingled yarn, the technology disclosed in WO 2016/167136 A1 can be employed. The resin preferably has a functional group (reactive group: polar group). Providing the resin with a functional group tends to further improve mechanical properties. Examples of the functional group include an amino group, a carboxyl group, a hydroxyl group, a cyanato groups, a glycidyl group, a thiol group, and a (meth)acryloyl group. Resins not having a functional group (reactive group: polar group) can also be used.

An example of one embodiment of the commingled yarn used in the present invention is a commingled yarn that is constituted of inorganic fibers and resin fibers (preferably thermoplastic resin fibers), and has a dispersibility of reinforcing fibers of 60% or more, and an impregnation ratio of resin fibers of 10% or less.

The thermosetting resin may be a resin constituted of only a thermosetting resin, or may be a resin containing the thermosetting resin as a main component. The molding material of the present invention may contain a thermosetting resin according to either of these cases. In the present invention (the present specification), unless otherwise specified, the term "thermosetting resin" includes both the case in which the resin is constituted of only a thermosetting resin, and the case in which the resin contains a thermosetting resin as a main component. Using the thermosetting resin as a main component means that the thermosetting resin accounts for 50 mass % or more. The thermosetting resin preferably accounts for 80 mass % or more, and more preferably 90 mass % or more.

Examples of the thermosetting resin include epoxy resins, vinyl ester resins, unsaturated polyester resins, diallyl phthalate resins, phenolic resins, maleimide resins, cyanate resins, benzoxazine resins, and dicyclopentadiene resins.

The thermoplastic resin may be a resin constituted of only a thermoplastic resin, or may be a resin containing the thermoplastic resin as a main component. The molding material of the present invention may contain a thermoplastic resin according to either of these cases. In the present invention (the present specification), unless otherwise specified, the term "thermoplastic resin" includes both the case in which the resin is constituted of only a thermoplastic resin, and the case in which the resin contains a thermoplastic resin as a main component. Using the thermoplastic resin as a main component means that the thermoplastic resin accounts for 50 mass % or more. The thermoplastic resin preferably accounts for 80 mass % or more, and more preferably 90 mass % or more.

Examples of thermoplastic resins include polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyetherketone resins, thermoplastic urethane resins, fluororesins, and thermoplastic polybenzimidazole resins.

Examples of the polyolefin resin include polyethylene resins, polypropylene resins, polybutadiene resins, polymethylpentene resins, vinyl chloride resins, vinylidene chloride resins, vinyl acetate resins, and polyvinyl alcohol resins.

Examples of the polystyrene resin include polystyrene resins, acrylonitrile-styrene resins (AS resins), and acrylonitrile-butadiene-styrene resins (ABS resins).

Examples of the polyamide resin include polyamide 6 resin (nylon 6), polyamide 11 resin (nylon 11), polyamide 12 resin (nylon 12), polyamide 46 resin (nylon 46), polyamide 66 resin (nylon 66), and polyamide 610 resin (nylon 610). Examples of nylon (hereinafter, may be abbreviated as "PA"), which is one type of polyamide resin, include PA6 (also referred to as polycaproamide, polycaprolactam, and poly ε-caprolactam), PA26 (polyethylene adipamide), PA46 (polytetramethylene adipamide), PA66 (polyhexamethylene adipamide), PA69 (polyhexamethylene adipamide), PA610 (polyhexamethylene sebacamide), PA611 (polyhexamethylene undecamide), PA612 (polyhexamethylene dodecamide), PA11 (polyundecane amide, PA12 (polydodecane amide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalamide), PA12T (polydodecamethylene terephthalamide), PA12I (polydodecamethylene isophthalamide), polyamide XD6 (polymetaxylylene adipamide), and polyamide XD10 (polyxylylene sebacamide).

Examples of the polyester resin include polyethylene terephthalate resin, polyethylene naphthalate resin, polybutylene terephthalate resin, polytrimethylene terephthalate resin, and liquid crystal polyester.

Examples of the (meth)acrylic resin include polymethyl methacrylate.

Examples of the modified polyphenylene ether resin include modified polyphenylene ethers and the like.

Examples of the thermoplastic polyimide resin include thermoplastic polyimide, polyamide-imide resin, and polyetherimide resin.

Examples of the polysulfone resin include modified polysulfone resins, and polyether sulfone resins.

Examples of the polyetherketone resin include polyether ketone resin, polyether ether ketone resin, and polyether ketone ketone resin.

Examples of the fluororesin include polytetrafluoroethylene, and the like.

Examples of fibers in the fiber-containing resin (fiber-reinforced resin) include inorganic fibers. Organic fibers may be used. A combination of both organic and inorganic fibers may also be used. The fibers are particularly preferably continuous reinforcing fibers having a fiber length of more than 30 mm. The average fiber length of the continuous reinforcing fibers used in the present invention is not particularly limited, but from the perspective of achieving excellent molding processability, the average fiber length is preferably in a range from 0.05 to 20000 m. The average fiber length is more preferably from 100 to 10000 m, and is even more preferably from 1000 to 7000 m. Unless otherwise stated, the length of the fibers in the present invention is the weight average fiber length. The average fiber diameter of the fibers is preferably not less than 3 μm, more preferably not less than 4 μm, and even more preferably not less than 5 μm. Furthermore, the number-average fiber diameter of the fibers is preferably not more than 50 μm, more preferably not more than 20 μm, and even more preferably not more than 12 μm. The average fiber diameter is the diameter of a single fiber.

Examples of the inorganic fibers include carbon fibers, silicon carbide fibers, alumina fibers, boron fibers, glass fibers, and metal fibers, and carbon fibers and glass fibers are preferable. However, the inorganic fibers are not limited thereto.

Examples of the carbon fibers include polyacrylonitrile (PAN) based carbon fibers, petroleum/coal pitch-based carbon fibers, rayon-based carbon fibers, cellulose-based carbon fibers, lignin-based carbon fibers, phenol-based carbon fibers, and vapor phase growth-based carbon fibers. Among these, one or more types may be used, as appropriate. The carbon fibers that are used preferably have a tensile elastic modulus from 100 GPa to 1000 GPa. The form of the carbon fibers is not particularly limited. The carbon fibers may be in a form of continuous or discontinuous fibers. Examples of continuous fibers include those in which carbon fibers are arranged in one direction (unidirectional material). When discontinuous fibers are used, examples include materials arranged so that the carbon fibers are oriented in a specific direction in the resin, and materials in which the carbon fibers are randomly dispersed and arranged in the in-plane direction in the resin. The carbon fiber may be a single fiber, a fiber bundle, or a mixture of both. Carbon fibers are generally in the form of a fiber bundle in which thousands to tens of thousands of filaments are assembled. For a case in which a carbon fiber bundle is used as the carbon fibers, when the carbon fiber bundle is used as is, the entangled portion of the fiber bundle becomes locally thick, which may make it difficult to obtain a carbon-fiber-reinforced resin workpiece having a thin-walled end surface. Therefore, when a carbon fiber bundle is used as the carbon fibers, the carbon fiber bundle is preferably widened or opened, and then used.

Examples of the metal fibers include Al fibers, Au fibers, Ag fibers, Fe fibers, and stainless steel fibers.

Examples of organic fibers include aramid fibers, aromatic polyamide fibers, cellulose fibers, polyethylene fibers, and poly(paraphenylene benzobisoxaxole) fibers (Zylon (available from Toyobo Co., Ltd.)).

The fibers may be treated with a treatment agent. Examples of the treatment agent include a sizing agent. Another example is a surface treatment agent. Examples thereof include the treatment agents disclosed in JP 4894982 B. It is advantageous for the treatment agent on the fiber surface to react with a functional group (reactive group: polar group) of the resin.

The treatment agent is selected from the group consisting of, for example, epoxy resins, urethane resins, silane coupling agents, water-insoluble polyamide resins, and water-soluble polyamide resins. The treatment agent is preferably selected from the group consisting of epoxy resins, urethane resins, water-insoluble polyamide resins, and water-soluble polyamide resins. A single type of treatment agent may be used, or two or more types may be combined and used.

Examples of the epoxy resin include glycidyl compounds (for example, epoxy alkane, alkane diepoxide, bisphenol A-glycidyl ether, a dimer of bisphenol A-glycidyl ether, a trimer of bisphenol A-glycidyl ether, an oligomer of bisphenol A-glycidyl ether, a polymer of bisphenol A-glycidyl ether, bisphenol F-glycidyl ether, a dimer of bisphenol F-glycidyl ether, a trimer of bisphenol F-glycidyl ether, an oligomer of bisphenol F-glycidyl ether, a polymer of bisphenol F-glycidyl ether, stearyl glycidyl ether, phenyl glycidyl ether, ethylene oxide lauryl alcohol glycidyl ether, ethylene glycol diglycidyl ether, polyethylene glycol diglycidyl ether, and propylene glycol diglycidyl ether), glycidyl ester compounds (for example, glycidyl benzoate, glycidyl p-toluate, glycidyl stearate, glycidyl laurate, glycidyl palmitate, glycidyl oleate, glycidyl linoleate, glycidyl linolenate, and diglycidyl phthalate), and glycidyl amine compounds (for example, tetraglycidyl amino diphenylmethane, triglycidyl aminophenol, diglycidyl aniline, diglycidyl toluidine, tetraglycidyl meta-xylene diamine, triglycidyl cyanurate, and triglycidyl isocyanurate).

Examples of the urethane resin include polyols, polyols obtained by esterifying fats and polyhydric alcohols, and urethane resins obtained by reacting a polyisocyanate with a compound having an OH group.

Examples of the polyisocyanate include aliphatic isocyanates (for example, 1,4-tetramethylene diisocyanate, 1,6-hexamethylene diisocyanate, 2,2,4-trimethylhexamethylene diisocyanate, 2,8-diisocyanate methylcaproate), alicyclic diisocyanates (for example, 3-isocyanatomethyl-3,5,5-trimethylcyclohexyl isocyanate, methylcyclohexyl-2,4-diisocyanate), aromatic diisocyanates (for example, toluylene diisocyanate, diphenylmethane diisocyanate, 1,5-naphthene diisocyanate, diphenylmethylmethane diisocyanate, tetraalkyldiphenylmethane diisocyanate, 4,4-dibenzyl diisocyanate, and 1,3-phenylene diisocyanate), and halogenated diisocyanates (for example, chlorinated diisocyanates and brominated diisocyanates). The polyisocyanate may be one type or two or more types.

Examples of the polyol include ordinary polyols used in the production of urethane resins. Examples thereof include diethylene glycol, butanediol, hexanediol, neopentyl glycol, bisphenol A, cyclohexane dimethanol, trimethylolpropane, glycerin, pentaerythritol, polyethylene glycol, polypropylene glycol, polyester polyol, polycaprolactone, polytetramethylene ether glycol, polythioether polyol, polyacetal polyol, polybutadiene polyol, and furan dimethanol. The polyol may be one type or two or more types.

Examples of the silane coupling agent include trialkoxy or triallyloxy silane compounds (for example, aminopropyl triethoxysilane, phenylaminopropyl trimethoxysilane, glycidylpropyl triethoxysilane, methacryloxypropyl trimethoxysilane, and vinyl triethoxysilane), ureido silane, sulfidosilane, vinylsilane, and imidazole silane. The silane coupling agent may be one type or two or more types.

The water-insoluble polyamide resin is one for which 99 mass % or more does not dissolve when 1 g of the polyamide resin is added to 100 g of water at 25° C. When a water-insoluble polyamide resin is used, the water-insoluble polyamide resin is preferably used by dispersing (or suspending) the resin in a powdered form in water (or an organic solvent). A mixed fiber bundle can also be immersed in a dispersion (or suspension) of such a powdered water-insoluble polyamide resin and dried to form commingled yarns.

Examples of the water-insoluble polyamide resin include polyamide 6, polyamide 66, polyamide 610, polyamide 11, polyamide 12, and xylylene diamine-based polyamide resin (preferably, polyxylylene adipamide and polyxylylene sebacamide). Alternatively, a copolymer of the above may be used. The powder of the polyamide resin may be emulsified and dispersed by a surfactant (for example, a nonionic surfactant, a cationic surfactant, an anionic surfactant, or a mixture thereof). Commercially available products of water-insoluble polyamide resins (water-insoluble nylon emulsions) include, for example, Sepolsion PA (available from Sumitomo Seika Chemicals Co., Ltd.), and Michem Emulsion (available from Michelman, Inc.).

The water-soluble polyamide resin is one for which 99 mass % or more dissolves in water when 1 g of the polyamide resin is added to 100 g of water at 25° C. Examples of the water-soluble polyamide resin include modified polyamides such as an acrylic acid grafted N-methoxymethylated polyamide resin, and an amide group-added N-methoxymethylated polyamide resin. Examples of commercially available water-soluble polyamide resins include AQ-Nylon (available from Toray Industries, Inc.), and Toresin (available from Nagase Chemtex Corp.).

The amount of the treatment agent is preferably from 0.001 to 1.5 mass % of the reinforcing fibers (for example, carbon fibers or the like). The amount thereof is more preferably from 0.1 to 1.2 mass %, and is even more preferably from 0.5 to 1.1 mass %. Dispersibility of the reinforcing fibers is improved by setting the amount of the treatment agent to such a range.

A known method can be adopted as the treatment method using the treatment agent. For example, the fibers may be immersed in a treatment agent solution. Through this, the treatment agent adheres to the fiber surface. A technique for air blowing a treatment agent onto the surface of the fibers can also be used. Fibers that have already been treated with a surface treatment agent (or a treatment agent) may also be used. Commercially available fibers to which the surface treatment agent (or treatment agent) is adhered may be washed, and a surface treatment agent (or treatment agent) may be once again adhered thereto.

The proportion of fibers having a length of more than 30 mm is preferably 30 vol. % or more. The proportion thereof is more preferably 40 vol. % or more, and is even more preferably 45 vol. % or more. Alternatively, the proportion thereof is preferably 30 mass % or more, more preferably 42 mass % or more, and even more preferably 55 mass % or more. There is no special restriction on the upper limit. As one standard, the upper limit is, for example, 70 vol. %, and preferably 60 vol. %. Alternatively, the upper limit is preferably 80 mass %.

A preferable resin used in the commingled yarn is a thermoplastic resin. Examples of thermoplastic resins include polyolefin resins (for example, polyethylene, and polypropylene), polyamide resins, polyester resins (for example, polyethylene terephthalate, and polybutylene terephthalate), polycarbonate resins, polyoxymethylene resins, polyether ketones, polyether sulfones, and thermoplastic polyether imides. The thermoplastic resin is preferably a polyamide resin, and is more preferably a polyamide resin constituted by a diamine component and a dicarboxylic acid component, 70 mol % or more of the diamine component being xylylene diamine, and 70 mol % or more of the dicarboxylic acid component being an $\alpha,\omega$-linear aliphatic dicarboxylic acid having from 4 to 20 carbons (preferably sebacic acid and/or adipic acid).

The thermoplastic resin composition may include an elastomer component. Examples of the elastomer component include polyolefin-based elastomers, diene-based elastomers, polystyrene-based elastomers, polyamide-based elastomers, polyester-based elastomers, polyurethane-based elastomers, fluorine-based elastomers, and silicon-based elastomers. The elastomer component is preferably a polyolefin-based elastomer or a polystyrene-based elastomer. Modified elastomers modified by an $\alpha,\beta$-unsaturated carboxylic acid and acid anhydrides thereof, acrylamide and derivatives thereof, or the like in the presence (or absence) of a radical initiator are also preferable. These elastomers are used to impart miscibility with the polyamide resin. When the aforementioned elastomer is used, the blended amount of the elastomer component is preferably from 5 to 25 mass % of the thermoplastic resin composition.

Furthermore, various additives (for example, antioxidants, stabilizers such as thermal stabilizers, hydrolysis resistance improving agents, weather resistant stabilizers, matting agents, UV absorbers, nucleating agents, plasticizers, dispersants, flame retardants, antistatic agents, anticoloration agents, anti-gelling agents, colorants, release agents, and the like) may be added to the thermoplastic resin composition within a scope that does not impair the object and effect of the present invention. For details, refer to the disclosure of JP 4894982 B, the contents of which are incorporated herein. The thermoplastic resin composition may include a filler. However, a filler is preferably not included. Specifically, the content of the filler in the thermoplastic resin composition is 3 mass % or less.

The blending ratio of the resin and the fibers varies depending on the product of interest. Thus, the blending ratio it not easily decided unequivocally. However, the blending ratio is preferably such that the ratio (mass ratio) of the (fiber)/(resin) is from 1/99 to 90/10. The ratio thereof is more preferably 10/90 or more, and is more preferably 80/20 or less.

A second aspect of the present invention is a molding method. The molding method is a molding method by a molding apparatus including a nozzle, a guide member guiding a molding material to the nozzle, and a heating device. For example, the molding method is a molding method by the aforementioned molding apparatus. In the molding method, the molding material is transported through the nozzle is heated (controlled) so as to melt by the heat of the heating device. For example, the molding material is heated (controlled) so as to melt while transported through (and particularly, after transported through) the nozzle port of the nozzle. In addition, the heat of the heating device is controlled so that the molding material transported through the guide member does not melt.

The present invention will be described in detail below. The following example is only one example of the present invention, and the present invention is not limited to the example described below. In other words, variations and application examples in which the merits of the present invention are not greatly impaired are also included in the present invention.

FIG. 1 is a schematic view in a vicinity of a nozzle of a molding apparatus (3D printer) of a first embodiment of the present invention.

In FIG. 1, the reference numeral 1 denotes CFRP. This CRFP 1 is a wire material. Reference numeral 2 denotes an extruder, 3 denotes a cutting device, 4 denotes a guide member (guide tube: guide pipe), 5 denotes an injection nozzle, and 6 denotes a heater. The injection nozzle 5 is made of metal. The metal injection nozzle 5 has a nozzle port 5A. The heater 6 is built into the metal injection nozzle 5. The heater 6 may of course also be a type that is not built-in. The heat of the heater 6 is efficiently transmitted through the metal injection nozzle 5. As a result, the CFRP 1 at the nozzle port 5A position melts. The melted CRFP 1 is then supplied to a stage (base) 7 and adhered thereto. In this manner, wiring 8 made of CFRP is formed.

Figure 9:
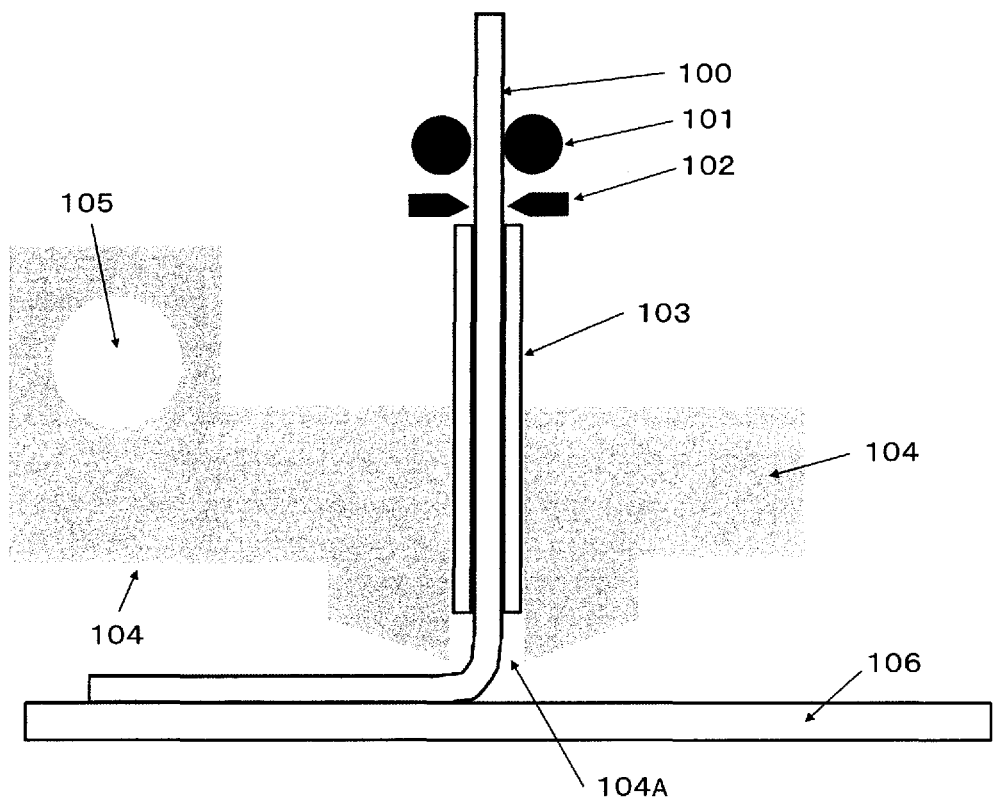
FIG. 9 is a schematic view in the vicinity of a nozzle of a molding apparatus not of the present invention.

In the molding apparatus of FIG. 9, a guide member 103 and a metal injection nozzle 104 are in close contact. In other words, there is no gap between an inner wall surface of a guide member 103 insertion hole and an outer wall surface of the guide member 103 in the metal injection nozzle 104. Therefore, the guide member 103 itself is heated by the heater 105. In addition, the nozzle port 104A is also heated.

In contrast, in the molding apparatus of the first embodiment (the device of FIG. 1), a gap 9 is provided between the guide member 4 and the metal injection nozzle 5. As a result, the guide member 4 and the injection nozzle 5 are not in close contact. Air is normally present in this gap 9. Therefore, even when the heat of the heater 6 (the heating temperature of the heater 6 is, for example, from 100 to 400° C.) is transmitted to the surface of the metal injection nozzle 5, the heat is blocked by the presence of the gap (air layer) 9. That is, the resin of the CFRP 1 being transported through the guide member 4 is not melted by the heat of the heater 6. Even if the heat of the heater 6 heats the CFRP 1 being transported through the guide member 4, the heating temperature thereof does not increase. Since the CFRP 1 being transported through the guide member 4 does not melt, the CFRP 1 does not bond to the inner wall surface (inner wall surface of the hole) 4A of the guide member 4. That is, the hole in the guide member 4 does not become clogged. The CFRP 1 moves smoothly within the hole of the guide member 4, and thus the molding operation is performed smoothly. In addition, defective products are not easily generated. The heat of the heater 6 is efficiently transmitted to the surface of the metal injection nozzle 5, and thus, the CFRP 1 that is in contact with the nozzle port 5A melts.

In the molding apparatus of the first embodiment (the apparatus in FIG. 1), the inner diameter (hole diameter) of the guide member 4 is 1.0 mm and the outer diameter is 1.4 mm. A distance a (shortest distance) between the location of the nozzle port 5A and the tip end position of the guide member 4 is 0.2 mm, and the distance b between the inner wall surface of the guide member 4 insertion hole in the metal injection nozzle 5 and the outer wall surface of the guide member 4 is 0.3 mm. An inner diameter c of the nozzle port 5A is 2.5 mm.

Figure 2:
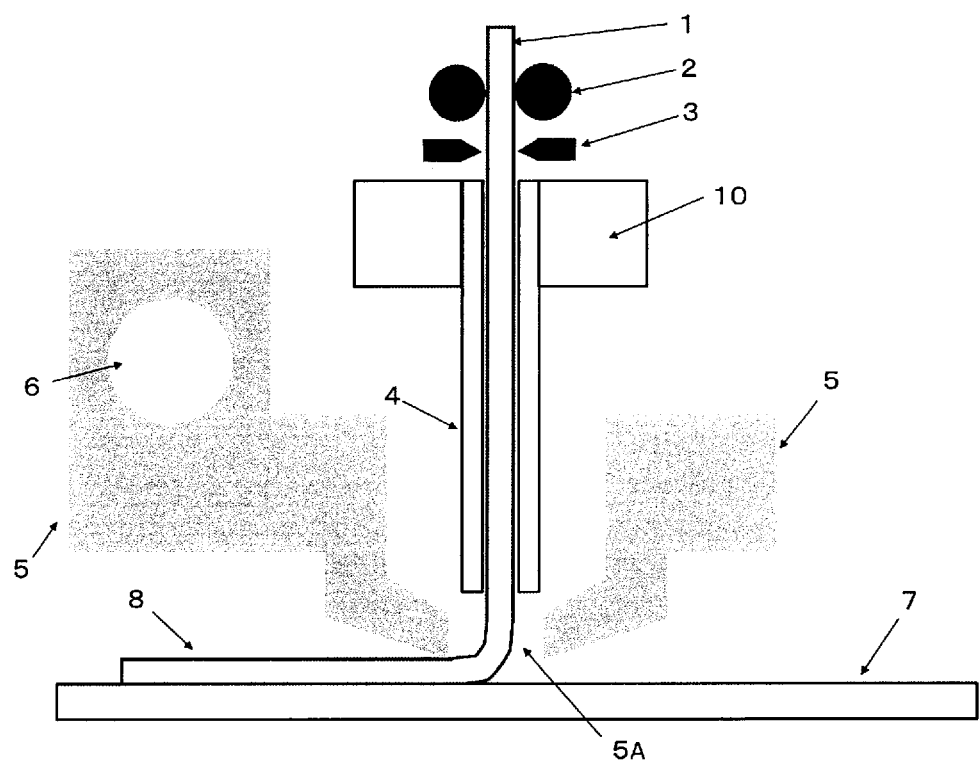
FIG. 2 is a schematic view in the vicinity of a nozzle of a molding apparatus of a second embodiment of the present invention.

FIG. 2 is a schematic view in the vicinity of the nozzle of a molding apparatus of a second embodiment of the present invention.

In the present embodiment, metal plates (heat sink: heat dissipating fins) 10 are provided on the guide member 4. From the perspective of machinability and thermal conductivity, the heat dissipating fins are preferably made from aluminum.

The present embodiment is obtained by merely providing the guide member 4 of the molding apparatus of the first embodiment with the metal plates (heat sink: heat dissipating fins) 10, and thus other detailed descriptions are omitted. The same reference numerals are assigned to the same portions.

Figure 3:
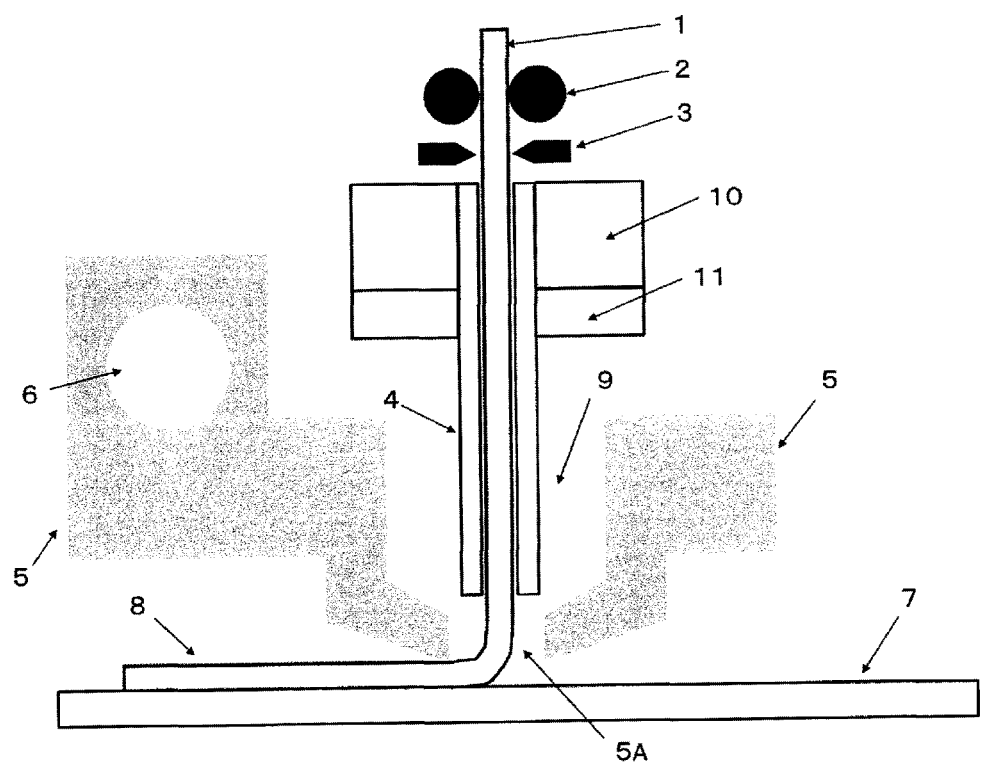
FIG. 3 is a schematic view in the vicinity of a nozzle of a molding apparatus of a third embodiment of the present invention.

FIG. 3 is a schematic view in the vicinity of the nozzle of a molding apparatus of a third embodiment of the present invention.

In the present embodiment, a heater (pre-heating device) 11 is provided on the guide member 4. The heater 11 merely heats the CFRP 1 being transported through the guide member 4 to a temperature of around, for example, {(heat generation temperature of the heater 6−printing environment temperature)×(3 to 50)%+printing environment temperature (from 22.4 to 60° C. if the heat generation temperature of the heater 6 is 100° C. and the printing environment temperature is 20° C., or from 31.4 to 210° C. if the heat generation temperature of the heater 6 is 400° C. and the printing environment temperature is 20° C.)}. The CFRP 1 being transported through the guide member 4 is merely heated to a temperature that is lower than the temperature at which the CFRP 1 melts. Therefore, the CFRP 1 being transported through the guide member 4 does not melt.

The present embodiment is obtained by merely providing the guide member 4 of the molding apparatus of the second embodiment with the heater 11, and thus other detailed descriptions are omitted. The same reference numerals are assigned to the same portions.

Figure 4:
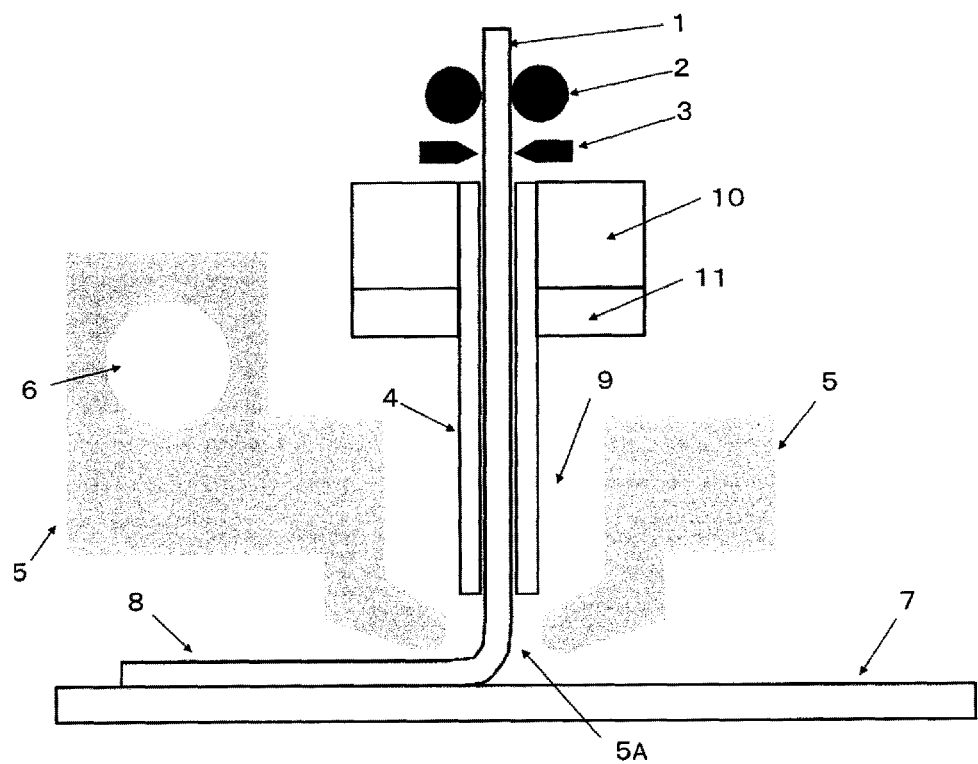
FIG. 4 is a schematic view in the vicinity of a nozzle of a molding apparatus of a fourth embodiment of the present invention.

FIG. 4 is a schematic view in the vicinity of the nozzle of a molding apparatus of a fourth embodiment of the present invention.

In the present embodiment, the nozzle port 5A has a rounded shape. By configuring in this manner, fiber breakage of the CFRP 1 is less likely to occur.

The other configurations are the same as the molding apparatus of the third embodiment, and thus detailed descriptions thereof are omitted. The same reference numerals are assigned to the same portions.

Figure 5:
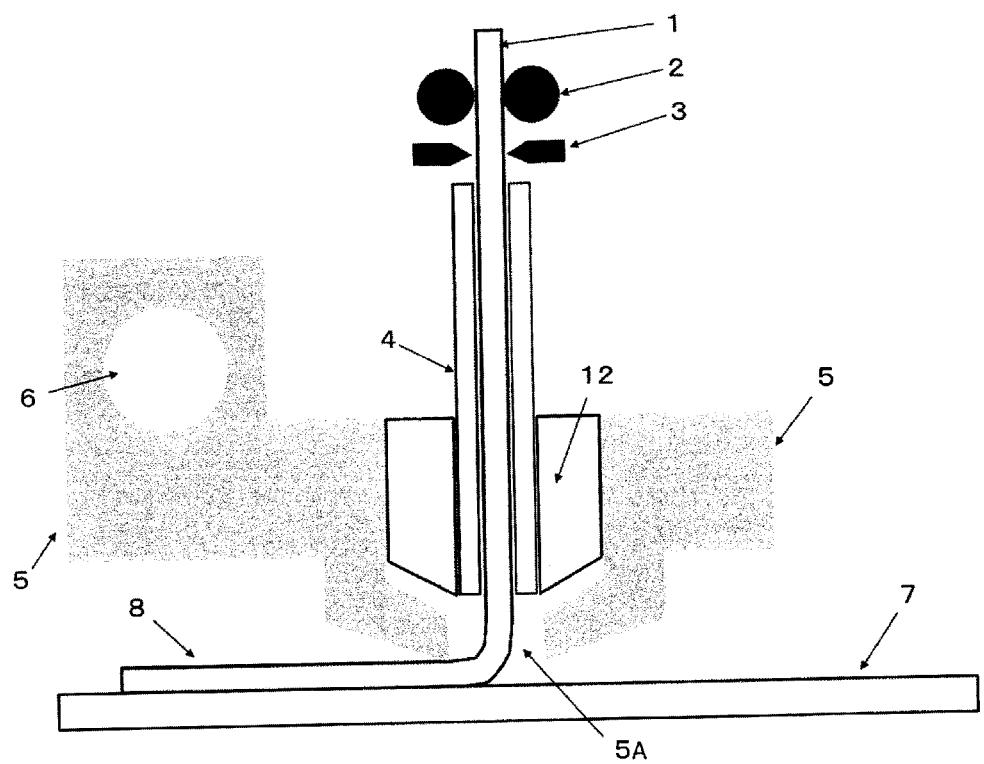
FIG. 5 is a schematic view in the vicinity of a nozzle of a molding apparatus of a fifth embodiment of the present invention.

FIG. 5 is a schematic view in the vicinity of the nozzle of a molding apparatus of a fifth embodiment of the present invention.

In the present embodiment, a heat insulation material (non-metallic material) 12 is provided between the guide member 4 and the heater 6. The heat insulation material 12 is attached to the inner wall surface of the guide member 4 insertion hole of the injection nozzle 5. This makes it difficult for the heat of the heater 6 to be transmitted to the guide member 4. The heat insulation material 12 may be attached to the outer wall surface of the guide member 4. The heat insulation material 12 may also be disposed only in the guide member insertion hole.

Other configurations are the same as the molding apparatus of the first embodiment, and thus detailed descriptions thereof will be omitted. The same reference numerals are assigned to the same portions.

Figure 6:
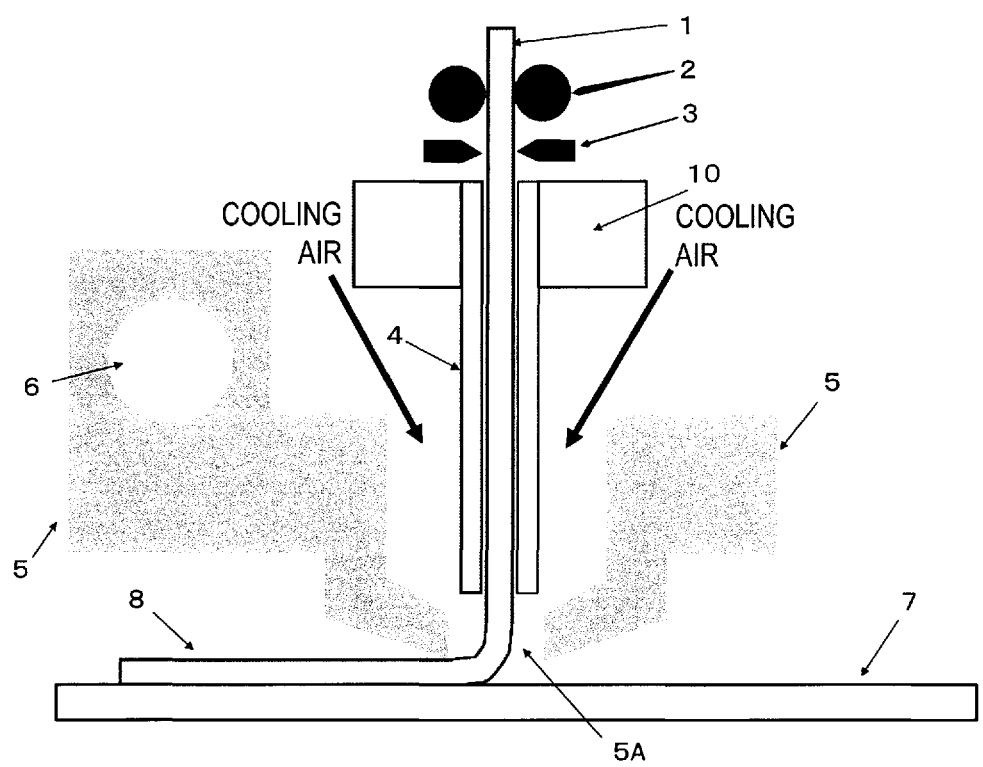
FIG. 6 is a schematic view in the vicinity of a nozzle of a molding apparatus of a sixth embodiment of the present invention.

FIG. 6 is a schematic view in the vicinity of the nozzle of a molding apparatus of a sixth embodiment of the present invention.

The present embodiment was achieved by merely providing a blowing structure (not illustrated). Air blown from the blowing structure (cooling air: illustrated by arrows) suppresses (prevents) an increase in the temperature of the guide member 4. In other words, the temperature of the guide member 4 does not increase. Therefore, the CFRP 1 being transported through the guide member 4 does not melt.

Other configurations are the same as the molding apparatus of the second embodiment, and thus detailed descriptions thereof will be omitted. The same reference numerals are assigned to the same portions.

FIG. 7 is a schematic view in the vicinity of the nozzle of a molding apparatus of a seventh embodiment of the present invention.

The present embodiment is an example in which the guide member 4 of the molding apparatus of the first embodiment is extended to a position near the nozzle port 5A. Note that the distance a (shortest distance) between the location of the nozzle port 5A and the outer wall surface of the guide member 4 is 0.1 mm, and the inner diameter c of the nozzle port 5A is 2.5 mm.

Other configurations are the same as the molding apparatus of the first embodiment, and thus detailed descriptions thereof will be omitted. The same reference numerals are assigned to the same portions.

Figure 8:
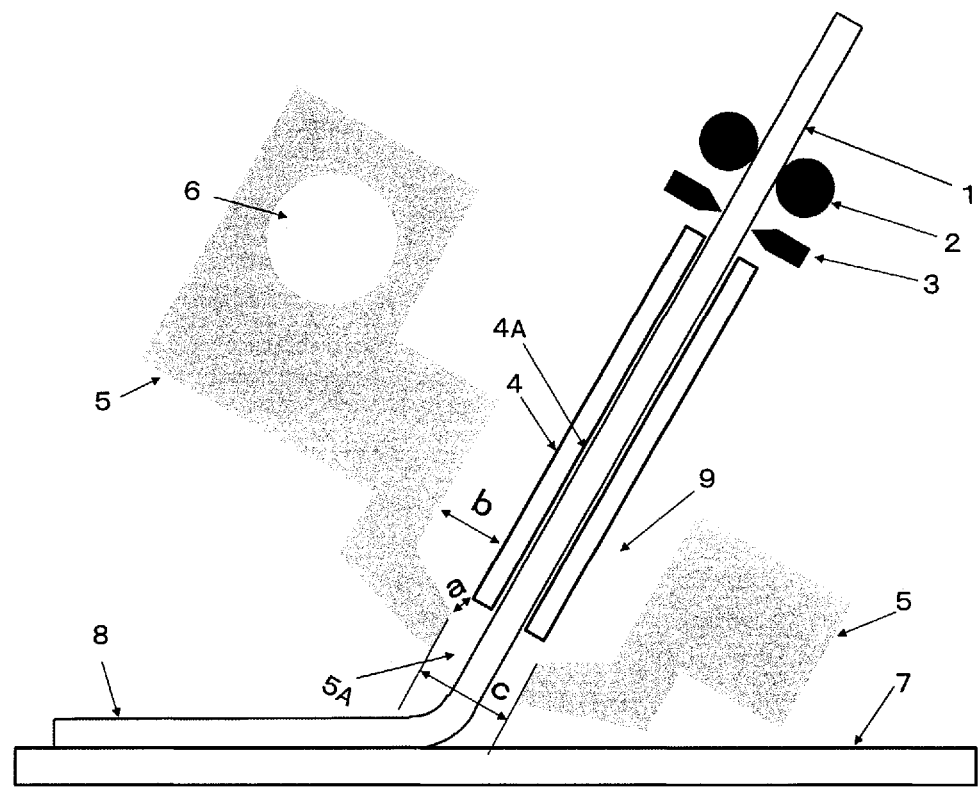
FIG. 8 is a schematic view in the vicinity of a nozzle of a molding apparatus of an eighth embodiment of the present invention.

FIG. 8 is a schematic view in the vicinity of the nozzle of a molding apparatus of an eighth embodiment of the present invention.

In the above-described embodiments, the guide member 4 and the nozzle port 5A are present in a vertical direction with respect to the stage (base) 7. In contrast, the present embodiment is achieved by merely inclining the guide member 4 and the nozzle port 5A with respect to the stage (base) 7, and thus detailed descriptions thereof are omitted. Note that the same reference numerals are assigned to the same portions.

Figure 10:
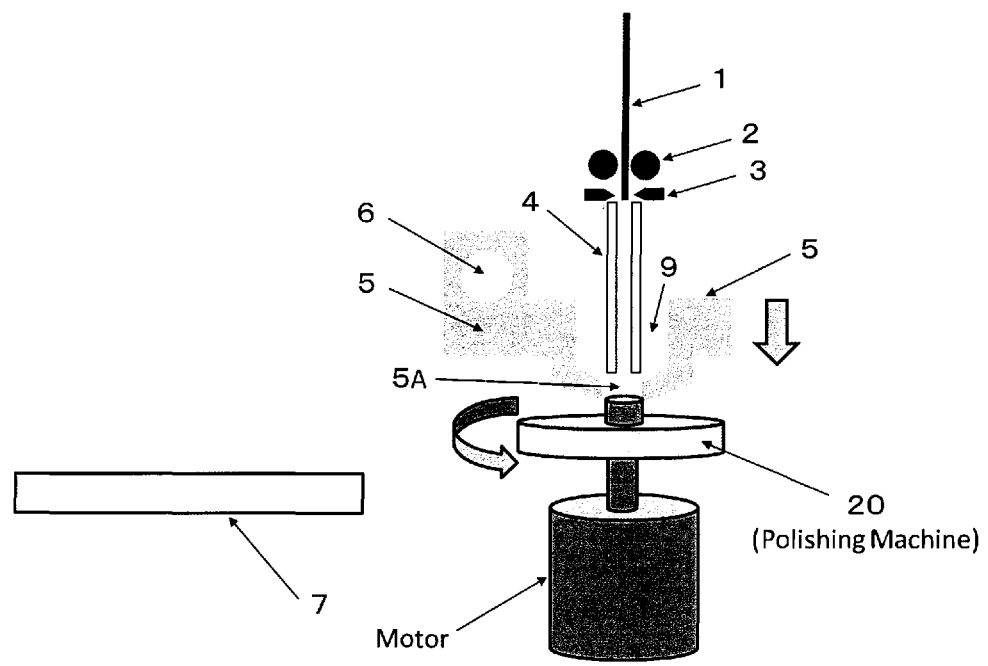
FIG. 10 is a schematic view of a cleaning structure for cleaning the nozzle port of the nozzle of the first to eighth embodiments of the present invention.

FIG. 10 is a schematic view of a cleaning structure for cleaning the nozzle port of the nozzle of the first to eighth embodiments of the present invention.

It is assumed that the apparatuses of the above-described embodiments are continuously operated for a long period of time. The CFRP 1 melts at the nozzle 5, and thus the melted resin and fibers may adhere and deposit on the nozzle port 5A of the nozzle 5. When this occurs, a polishing structure 20 is moved to the nozzle port 5A. The polishing structure 20 positioned opposing the nozzle port 5A cleans the nozzle port 5A. In this cleaning operation, cleaning can be easily performed when a void is present between the guide member 4 and the injection nozzle 5. In addition, cleaning is performed neatly. Cleaning is neatly performed when air is blown as in the sixth embodiment.

REFERENCE SIGNS LIST

1 CFRP
2 Extruder
3 Cutting device
4 Guide member
5 Metal injection nozzle
5A Nozzle port
6 Heater (heating device)
8 Wiring
9 Gap (air layer: heat insulating layer)
10 Metal plate (heat sink: heat dissipating fins)
11 Heater (pre-heating device)
12 Heat insulation material

The invention claimed is:

1. A molding apparatus comprising a nozzle, a guide member guiding a molding material to the nozzle, and a heating device, wherein
the molding material contains a thermoplastic resin,
the guide member being a tubular member,
a prevention structure to prevent melting of the molding material during transportation of the molding material through the guide member is a heat insulation material, or a gap between the heating device and the guide member,
a part of the guide member is disposed inside the nozzle,
the heating device heats the molding material so as to melt during transportation of the molding material through a nozzle port of the nozzle,
the nozzle includes the nozzle port and a hole that is communicated with the nozzle port,
a tip end side of the guide member is disposed toward the nozzle port, the shortest distance between a location of the nozzle port and the tip end position of the guide member is smaller than an inner diameter of the nozzle port, a temperature of the guide member is less than a temperature at which the molding material being transported through the guide member melts and is 50° C. or less, the heat of the heating device does not melt the molding material during transportation of the molding material through the guide member, and the nozzle port has a rounded shape.

2. The molding apparatus according to claim 1, wherein the heat insulation material is one or more selected from the group consisting of a gas, a liquid, and a solid.

3. The molding apparatus according to claim 2, wherein the gas is one or more selected from the group consisting of air, nitrogen, and carbon dioxide.

4. The molding apparatus according to claim 2, wherein the solid is a non-metallic material.

5. The molding apparatus according to claim 1, wherein the gap is defined by a distance from 3 to 500% of a maximum inner diameter dimension of the nozzle port.

6. The molding apparatus according to claim 1, wherein the molding material is a fiber-containing resin.

7. The molding apparatus according to claim 1, wherein the molding material is a conductive fiber-containing resin.

8. The molding apparatus according to claim 1, wherein the molding material is a commingled yarn.

9. The molding apparatus according to claim 1, further comprising a cleaning structure for cleaning the nozzle port of the nozzle.

\* \* \* \* \*